(12) United States Patent
Terry

(10) Patent No.: US 8,988,611 B1
(45) Date of Patent: Mar. 24, 2015

(54) PRIVATE MOVIE PRODUCTION SYSTEM AND METHOD

(71) Applicant: Kevin Terry, Miami, FL (US)

(72) Inventor: Kevin Terry, Miami, FL (US)

(*) Notice: Subject to any disclaimer, the term of this patent is extended or adjusted under 35 U.S.C. 154(b) by 0 days.

(21) Appl. No.: 14/135,832

(22) Filed: Dec. 20, 2013

Related U.S. Application Data

(60) Provisional application No. 61/739,788, filed on Dec. 20, 2012.

(51) Int. Cl.
H04N 5/222 (2006.01)
G06F 3/048 (2013.01)

(52) U.S. Cl.
CPC ................................. H04N 5/2224 (2013.01)
USPC ......................................... 348/722; 715/751

(58) Field of Classification Search
USPC ...................... 348/722; 352/38, 48, 44, 5, 25;
345/473; 715/723, 726, 751, 733, 756,
715/753; 705/300, 301, 319
See application file for complete search history.

(56) References Cited

U.S. PATENT DOCUMENTS

| | | | | |
|---|---|---|---|---|
| 6,160,907 A * | 12/2000 | Robotham et al. | ............ | 382/154 |
| 2003/0001846 A1 * | 1/2003 | Davis et al. | .................... | 345/474 |
| 2003/0126600 A1 * | 7/2003 | Heuvelman | ..................... | 725/35 |
| 2006/0064644 A1 * | 3/2006 | Joo | ................................. | 715/751 |
| 2008/0028312 A1 * | 1/2008 | Alvarez et al. | ................. | 715/719 |
| 2008/0033735 A1 * | 2/2008 | Graham et al. | .................... | 705/1 |
| 2008/0307304 A1 * | 12/2008 | Feiler et al. | .................... | 715/700 |
| 2009/0147010 A1 * | 6/2009 | Russell et al. | ................. | 345/473 |
| 2010/0008639 A1 * | 1/2010 | Greenberg et al. | ............. | 386/52 |
| 2012/0005595 A1 * | 1/2012 | Gavade et al. | ................. | 715/751 |
| 2012/0016809 A1 * | 1/2012 | Frolov et al. | ................. | 705/36 R |
| 2012/0236160 A1 * | 9/2012 | Rezek et al. | ............. | 348/207.11 |
| 2013/0135315 A1 * | 5/2013 | Bares et al. | .................... | 345/473 |
| 2013/0151970 A1 * | 6/2013 | Achour | ......................... | 715/723 |
| 2013/0182225 A1 * | 7/2013 | Stout | ............................... | 352/48 |
| 2014/0133834 A1 * | 5/2014 | Shannon | ....................... | 386/278 |

* cited by examiner

Primary Examiner — Victor Kostak
(74) Attorney, Agent, or Firm — Allen, Dyer, Doppelt, Milbrath & Gilchrist

(57) ABSTRACT

A movie production system includes a computer system having machine readable memory and at least one processor executing a plurality of program modules. The computer system includes actor defined scene input data stored on the memory and that defines one or more scenes to be included in a movie produced the computer system. The program modules include a screenplay module, a virtual director module, and a movie compiler module. The screenplay module generates a screenplay that includes a sequence of scenes based on the actor defined scene input data. The virtual director module is in operable communication with movie-making equipment at a movie set where the movie is shot and provides visual and/or audible cues to the actor while acting the screenplay, indicating a change of scenes in the sequence of scenes. The movie compiler module receives video and audio data from the movie-making equipment and compiles the movie.

15 Claims, 4 Drawing Sheets

PRIVATE MOVIE PRODUCTION SYSTEM AND METHOD

CROSS-REFERENCE TO RELATED APPLICATION

This application claims the benefit of U.S. Provisional Application No. 61/739,788, filed Dec. 20, 2012, which is incorporated by reference herein.

FIELD OF THE INVENTION

The invention relates to the field of movie production and, more particularly, to computer-based movie production.

BACKGROUND

Making a professional movie usually requires a significant number of people to be involved. Such people may include, for example, actors, writers, directors, camera operators, editors, and set workers. Even in the twenty-first century, the art of conventional movie-making remains as hands-on as it has always been.

Computer technology now allows amateur movie-makers to produce movies using their home computers, but it still requires a large amount of creativity, time, and effort for an amateur movie-maker to do so. Many of the people who would like to produce a movie do not have the computer knowledge they need to shoot scenes, edit audio and video, and compile all of the various electronic files into a finished product. Moreover, many of the same people also desire to make movies in total privacy, without interference from any of the conventional movie production crew. This would save them embarrassment of having other people see their movies or their production plans.

SUMMARY

The movie production system and method aspects of the invention address this problem by providing a computer-based platform for making movies.

In an exemplary embodiment of the system, a computer system having machine readable memory and at least one processor executes a plurality of program modules. The computer system includes actor defined scene input data stored on the memory and that defines one or more scenes to be included in a movie produced by the computer system. The program modules include a screenplay module, a virtual director module, and a movie compiler module. The screenplay module generates a screenplay that includes a sequence of scenes based on the actor defined scene input data. The virtual director module is in operable communication with movie-making equipment at a movie set where the movie is shot and provides visual and/or audible cues to the actor while acting the screenplay, indicating a change of scenes in the sequence of scenes. The movie compiler module receives video and audio data from the movie-making equipment and compiles the movie.

The screenplay module may automatically generate the screenplay based on a predefined set of scenes that match the actor defined scene input data and may generate the screenplay without human interaction while the screenplay is being generated.

In an exemplary embodiment of the method, a plurality of program modules is executed on a computer system having machine readable memory and at least one processor. A screenplay is generated with a screenplay module. The screenplay includes a sequence of scenes selected based on actor defined scene input data stored on the memory and defining one or more scenes to be included in a movie produced by the computer system. The plurality of scenes is recorded at a movie set location using a virtual director module in operable communication with movie-making equipment at the movie set. The virtual director module provides visual and/or audible cues to the actor while acting the screenplay indicating a change of scenes in the sequence of scenes. A movie compiler module receives video and audio data from the movie-making equipment to make the movie.

DETAILED DESCRIPTION OF THE EMBODIMENTS

In the Summary and in the Detailed Description of The Embodiments, reference is made to particular features, including method steps. Where a particular feature is disclosed in the context of a particular aspect or embodiment, that feature can also be used, to the extent possible, in combination with and/or in the context of other aspects and embodiments.

In this section, embodiments will be described more fully. These embodiments may, however, take many different forms and should not be construed as limited to those set forth here.

Figure 1:
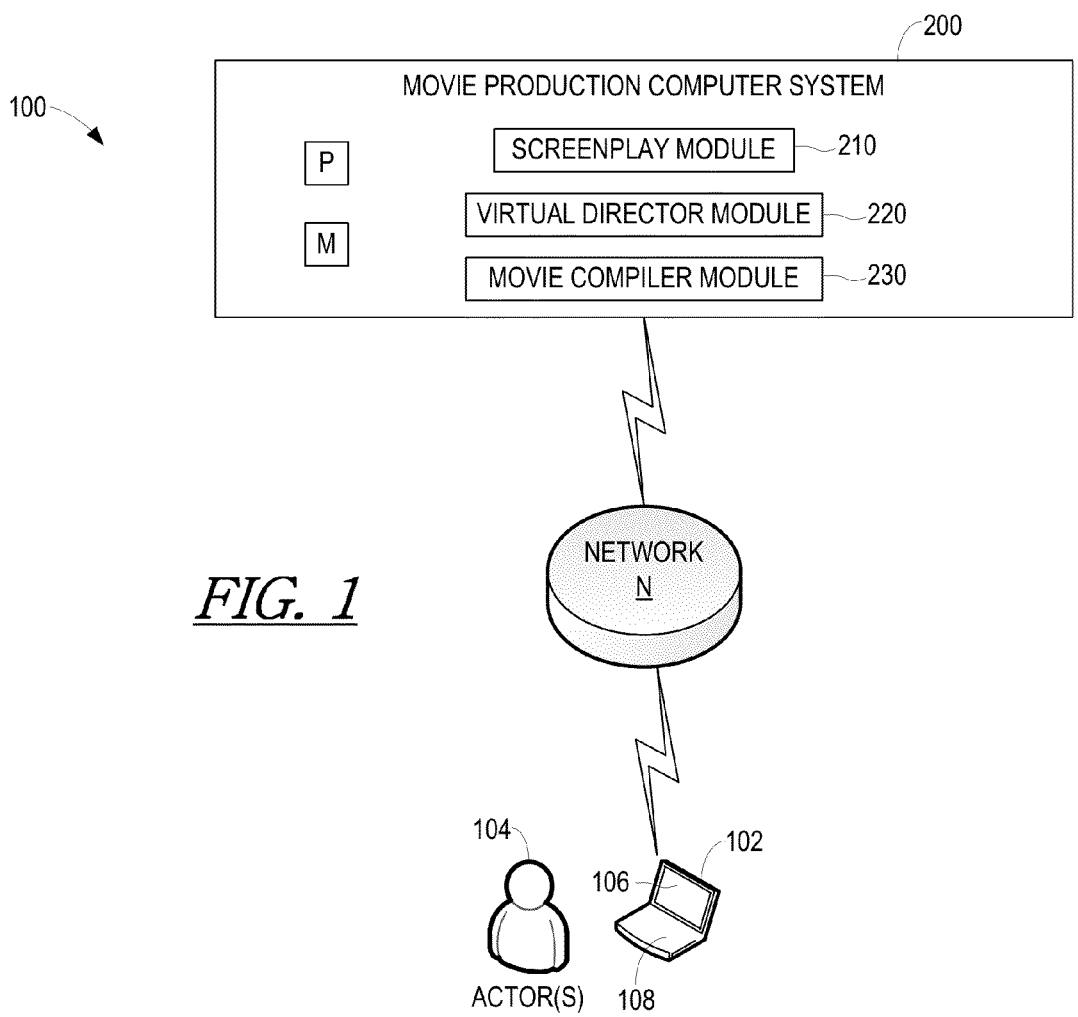
FIG. 1 is diagram of a movie production system embodiment.

An embodiment of the movie production system 100 is generally illustrated in FIG. 1. The system 100 includes a movie production computer system 200 in communication with a computer network N such as the Internet and one or more actor computer device(s) 102 that allow one or more actors 104 to communicate via the network N with the movie production computer system 200.

The movie production computer system 200 is configured to allow people who desire to act in a movie to privately design, shoot, edit, watch, and, if desired, distribute the movie. As used herein an "actor" 104 is a person that uses the movie production computer system 200 to produce a movie. Actors 104 may also include couples or a group of people, for example.

Actors 104 may communicate with the computer system 200 via the actor computer device 102. The actor computer device is 102 is an electronic device such as a computer, smart phone, tablet computer, or the like that can communicate information via the network N. The actor computer device 102 includes a display 106, such as a screen or the like, and an input interface 108, such as a keyboard or the like. The actor computer device 102 typically accesses the Internet directly through an Internet service provider (ISP) or indirectly through a network interface.

The network N is a communication network. Examples of suitable networks include the Internet or the like or a non-Internet based network.

The movie production computer system 200 includes at least one processor P executing machine readable program instructions stored on machine readable memory M. The invention is not limited to any particular number, type, or configuration of processors P, nor to any particular programming language, memory storage format or memory storage medium. In embodiments having multiple processors P and/or machine readable memory M storage media, the computer system 200 is not necessarily limited to any particular geographic location or networking or connection of the processors P and/or machine readable memory M storage media, provided that the processors P and/or machine readable memory M storage media are able to cooperate to execute the system's 200 functions. Further, it is not necessarily required that the processors P and/or machine readable memory M storage media be commonly owned or controlled. The machine readable memory M is non-transitory, meaning that it does not include transient signals.

The computer system 200 executes a plurality program modules, including a screenplay module 210, a virtual director module 220, and a movie compiler module 230. These modules are executed by the processor(s) P using program instructions stored on the memory M. The screenplay module 210 is adapted to automatically make a screenplay based on actor 104 input. The virtual director module 220 is adapted to automatically direct the screenplay as the actor(s) 104 act(s) out the scenes. The movie compiler module 230 is adapted to compile audio and video after the scenes are shot to make them into a finished movie. More details of how the computer system 200 executes these modules are now described.

Figure 2:
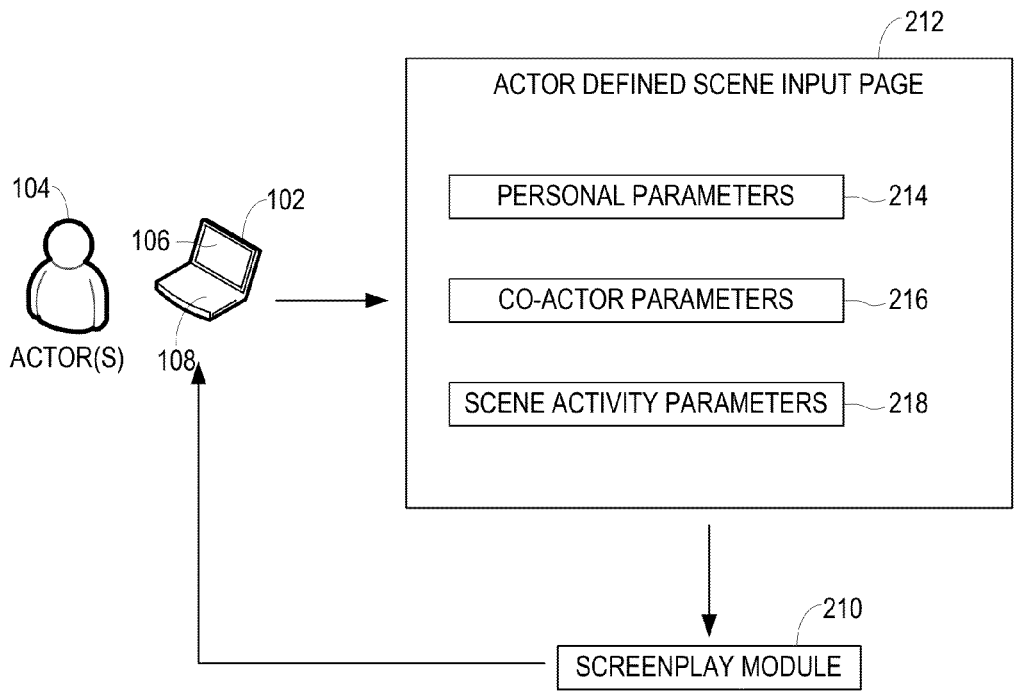
FIG. 2 is a diagram illustrating functions of the actor defined scene input page.
Figure 3:
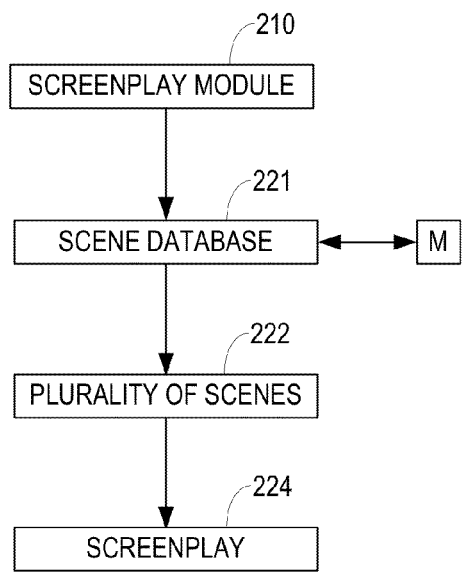
FIG. 3 is a diagram illustrating functions of the screenplay module.

Referring to FIGS. 2 and 3, the screenplay module 210 makes a screenplay 224 including a sequence of scenes according to actor 104 input. In order to obtain the actor 104 input, the computer system 200 executes an actor defined scene input page 212 that displays at the actor computer device 102. The scene input page 212 includes a plurality of data fields into which the actor 104 inputs information about the movie the actor 104 desires to have produced by the computer system 200. These data fields include a personal information data field 214, a co-actor parameters data filed 216, and a scene activity parameters data field 218.

In the personal information data field 214, the actor 104 inputs personal information about the actor 104, such as physical characteristics, including sex, gender, height, weight, build, skin color, eye color, and hair color. The actor may also input a name by which the actor 104 is to be identified.

In the co-actor parameters data field 216, the actor 104 inputs a description of one or more co-actors for the movie. The description may include, for example, physical characteristics of a desired co-actor, such as sex, gender, height, weight, build, skin color, eye color, and hair color. Performing this step is optional as the actor 104 may have already identified a co-actor for the movie or may desire to act alone in the movie.

The co-actor parameters are used by the computer system 200 to identify an actor with physical characteristics stored on the memory M that substantially match the co-actor parameters. This way the computer system 200 is able to select a suitable co-actor to act in the movie along with the actor 104 if the actor desires to have a co-actor.

In the scene activity parameters data field 218, the actor 104 inputs the type of scenes he/she would like to have in the movie and/or any particular activities the actor 104 desires to perform in the movie. Examples of these include various roles or storylines, including, for example, athlete, movie star, musician, etc. If the movie will include sexually explicit scenes, the actor 104 may input the types of sexual activities he or she desires to perform and/or those that he or she will not perform.

The facility where the movie set is located may provide actors that can be selected and/or hired by an actor 104 desiring to create a movie. Selection of co-actor(s) may be achieved by the computer system 200 as described above.

Figure 4:
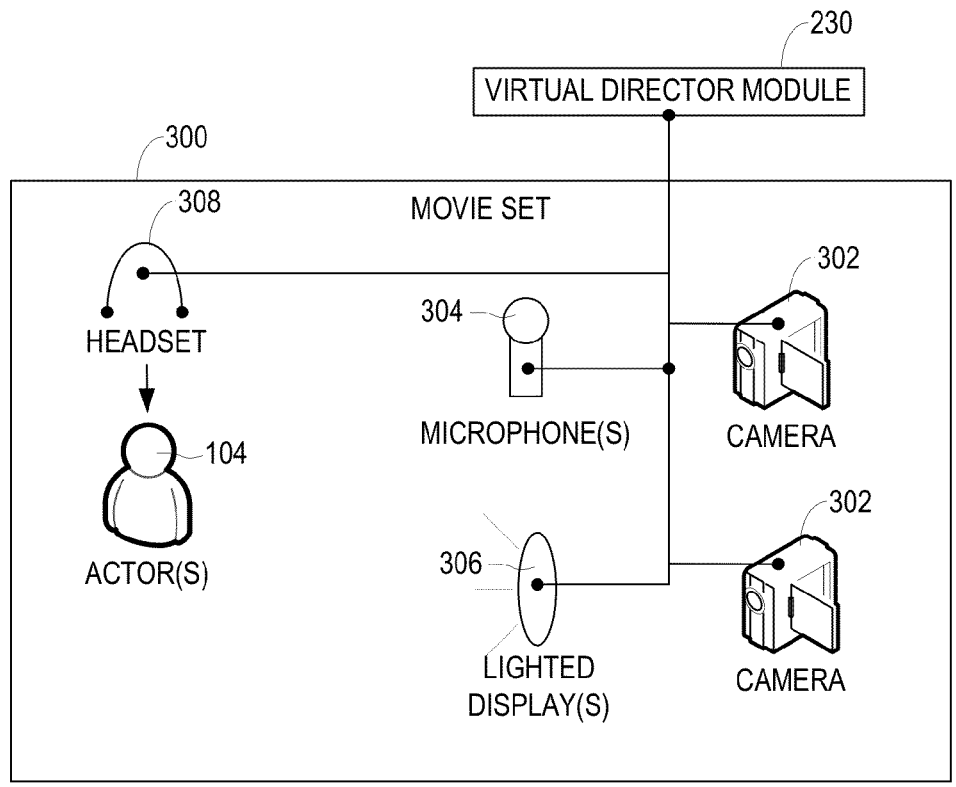
FIG. 4 is a diagram of a movie set and illustrates functions of the virtual director module.

The data input at the actor defined scene input page 212 is communicated to the computer system 200 and processed by the screenplay module 210 as illustrated in FIG. 3. The screenplay module 210 communicates with a scene database 221 located on the memory M. The scene database 221 stores scripts and shooting instructions for a plurality of predetermined scenes. The screenplay module 210 compares the predetermined scenes on the screen database 221 to the data the actor 104 input into the scene activity parameters data field 218. The screenplay module 210 then generates a plurality of successive scenes 222 from the scene database 221 using these data to form a screenplay 224. The screenplay 224 includes program instructions that instruct the virtual director module 220 how to shoot the movie, including when to cue the actor 104 about scene changes. Alternatively, the screenplay may be written by actors 104 themselves and stored on the scene database Referring to FIG. 4, once the screenplay 224 is finalized, the actor 104 appears at a movie set 300 where the movie is shot. The movie set 300 includes movie making equipment, such as one or more cameras 302, one or more microphones 304, and one or more lighted displays 306. The actor 104 may, if desired wear a headset 308 to receive audio cues from the virtual director module 220. The computer system 200 via the virtual director module 220 is in operable communication with the movie making equipment on the set 300. The virtual director module 220 controls the movie making equipment while in operation according to the instructions in the screenplay 224.

The movie set 300 functions like a film set and may take many different forms. The movie set 300 may be a room within a larger building or facility that includes numerous set rooms of various designs. Set rooms may be designed to appear as, but are not limited to, hotel rooms, classrooms, manager's offices, locker rooms, pool rooms, saunas, bedrooms, kitchens, gyms, automobiles, outdoor scenes, popular movie scenes, spaceships, and farm scenes, for example.

When the actor 104 is ready to begin shooting the movie, the actor 104 initiates the virtual director module 220 which executes the screenplay's 224 instructions as it progresses through the scenes.

The actor 104 acts out the scenes by receiving visible and/or audio cues from the virtual director module 220. For example, the virtual director module 220 may provide verbal instructions to the actor 104 through the headset 308 or may provide visual cues to the actor through the lighted display(s). Such audible and/or visual cues are useful, for example, to indicate a change of scenes in the plurality of scenes in the screenplay 224. As mentioned above, the program instructions in the screenplay 224 instruct the virtual director module 220 when to make these cues and what cues to make.

Lighted displays 306 may be, for example, television screens or the like, or another lighted object.

Figure 5:
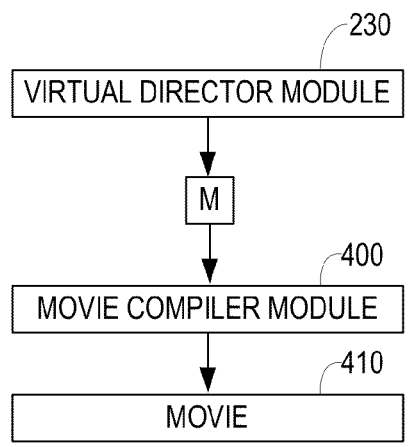
FIG. 5 is a diagram illustrating functions of the virtual director module and movie compiler module.

Referring to FIG. 5, the virtual director module 220 allows the video and audio data from shooting the movie to be stored on the memory M. The movie compiler module 400 retrieves the video and audio data and compiles it to make a finished movie 410. The movie compiler module 400 may also process the video and audio data by editing it and enhancing it using conventional techniques. The movie 410 is stored on the memory M.

The movie compiler module 230 is also adapted to perform post-production editing. For example, it is able to remove any of the visual or verbal cues that the virtual director module 220 provided to the actor(s) 104 during filming so that these cues do not appear in the finished movie 410. If an actor 104 wishes, it may have the movie compiler module 230 perform the final sound and video editing. The movie compiler module 230 may also put together a suggested mix, which may be further edited by the actor(s) 104 in a private mixing lab on site at the facility where the movie set is located. At the mixing lab, actors 104 can delete, erase, or change video shot at various camera angles.

The movie 410 may contain digital rights management (DRM) encoding to ensure controlled access. Prior to the shoot being produced and recorded, the actor(s) 104 involved may have the option to choose whether to include DRM or not. The computer system 200 may also store the footage and provide controlled access to those that the actor(s) 104 involved may choose. The actor(s) may also have the option to receive the final cut of the movie 410 on any form of conventional storage media.

If the actor(s) 104 chooses to have the movie 410 safeguarded by the computer system 200, it have several options. First, an actor 104 who hires other actors for a particular shoot may lock the footage as private to ensure that it does not fall into the wrong hands. Otherwise, the actor 104 may make the video footage publicly accessible. Second, if there are multiple actors 104 in a single shoot that are not hired actors, there may be shared, but controlled, access to the movie 410. By having the aforementioned methodology, any of the participants involved in a shoot may later decide to have footage deleted and simply direct the computer system to delete the movie 410, or they may have access to a predetermined web link, account, or hyperlink which allows instant deletion of viewing rights or the actual file. Additionally, the actors 104 in a particular shoot may agree to have the computer system 200 provide them with a copy of the movie 410 by one of the means previously described and then have the computer system 200 completely erase the movie file from memory M. This allows the actors 104 to have comfort in knowing that the movie 410 has been destroyed, leaving them solely in control of what happens with the movie 410. The actors 104 may also have the option to have the video uploaded to a website that is accessible to the general public or a website that has limited access (i.e., password controlled). Publicly accessible websites may further allow voting by viewers to determine top videos and/or top actors and actresses.

One of the advantageous aspects of the computer system 200 is that it can execute the aforementioned modules automatically, i.e. without non-actor input. This means that the entire movie can be produced without a non-actor ever seeing the actor's 104 input, screenplay 224, or the movie 410. Accordingly, by using the computer system 200, the actor 104 can essentially produce the movie privately.

The computer system 200 also enhances privacy by restricting access to the movie 410 via conventional computer security techniques. For example, the computer system 200 can give the actor 104 or actors an access code, such as password, that allows the actor(s) to access the movie 410, but prevents other parties from doing so. This way, the movie 410 cannot be viewed by anyone other than the actor(s) 104, unless the actor(s) 104 allow it to be distributed to them. The computer system 200 also allows the actor(s) 104 to delete the movie 410 if desired. One actor 104 in a multiple actor 104 movie 410 may delete the movie 410 without receiving the other actor's permission.

Figure 6:
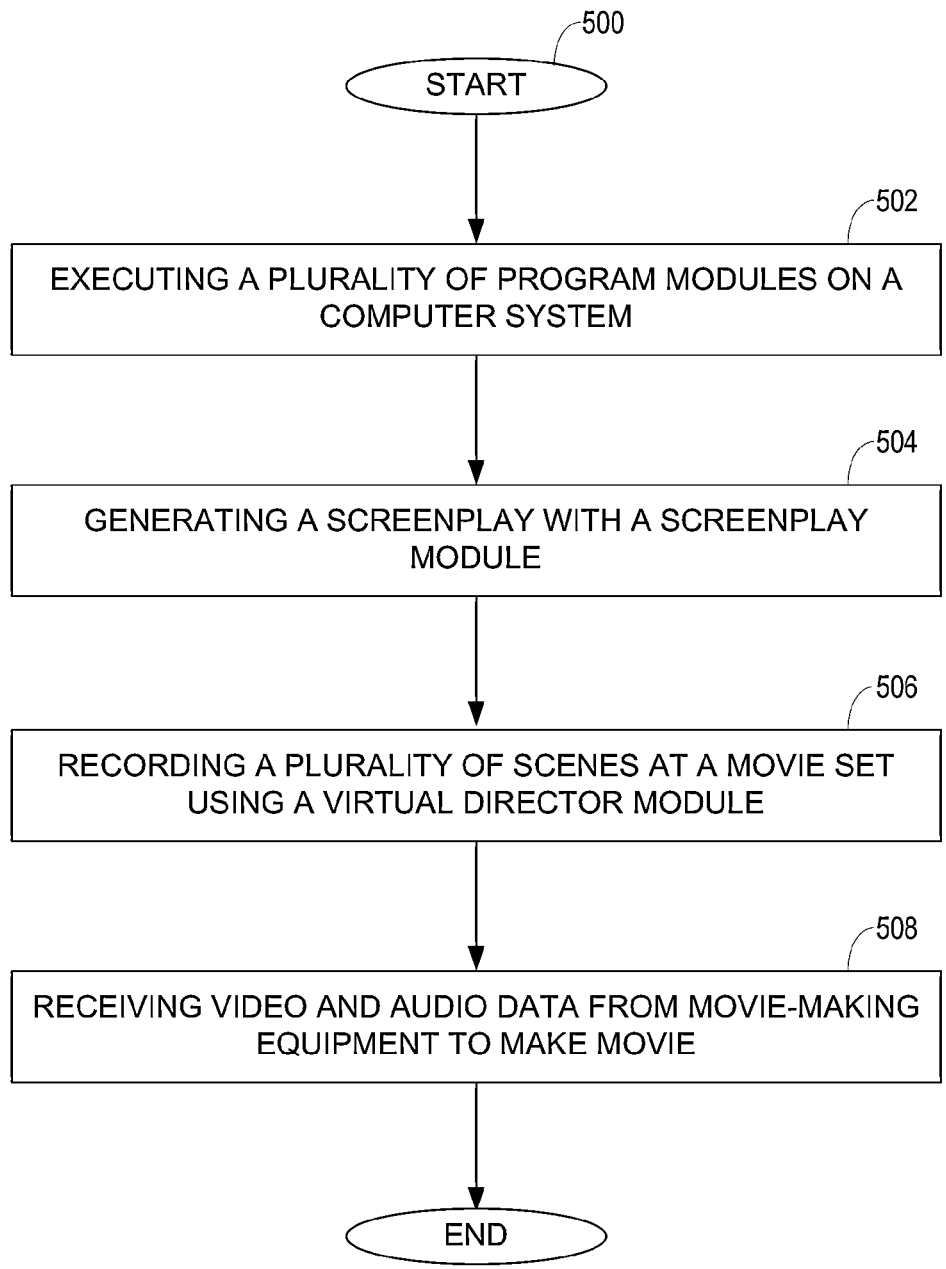
FIG. 6 is a flow chart of aspects of a movie production method embodiment.

A movie production method embodiment is now described with reference to FIG. 6. This method may be performed using the computer system 200.

The movie production method, beginning at block 500, starts by executing a plurality of program modules on a computer system having machine readable memory and at least one processor (Block 502). The method continues by generating a screenplay with a screenplay module where the screenplay includes a sequence of scenes selected based on actor defined scene input data stored on the memory and defining one or more scenes to be included in a movie produced by the computer system (Block 504). Next, the plurality of scenes is recorded at a movie set location using a virtual director module in operable communication with moviemaking equipment at the movie set (Block 506). The virtual director module provides visual and/or audible cues to the actor while acting the screenplay indicating a change of scenes in the sequence of scenes (Block 506). A movie compiler module receives video and audio data from the moviemaking equipment and compiles the video and audio data to make the movie (Block 508).

In certain embodiments of this method, the screenplay module, virtual director module, and movie compiler module are executed only in response to the actor's direct instruction. This means that the actor can privately produce the movie without input from another non-actor. For example, the virtual director module may automatically provide visual and/or audible cues to the actor while acting the screenplay without receiving human instruction to provide the cues during operation.

These system and method embodiments are particularly advantageous when a person desires to act in a movie but desires to do so privately. By using the computer system, an actor can effectively produce a movie without another person ever viewing the actor's input, the screenplay, or the finished movie. During filming at the movie set, the virtual director module controls filming, meaning that no movie production crew is necessary. This alleviates any privacy concerns or the actor(s) may have.

The system and method is most advantageous for making adult-oriented movies containing sexual content and/or nudity because the movie may be made privately. In such cases, the computer system 200 may be adapted to retrieve sexually-related information from the actor(s) 104. For example, in the personal information data field 214 an actor 104 may input other physical characteristics such as presence of body hair, presence of implants, sexual organ characteristics, and presence of any sexually transmitted diseases. Likewise, actors 104 may input similar physical features on the co-actor parameters data field 216. In the scene activity data field, actors 104 may input the types of sexual activities that he/she desires to perform or refuses to perform in the movie.

If the systems and methods are used to make adult-oriented movies, it may be desirable to determine whether any actors 104 are infected with a sexually transmitted disease prior to having any contact with a co-actor. In these cases, the computer system 200 is adapted to require actors 104 to input medical test results for sexually transmitted diseases before allowing the actors 104 to appear at the movie set 300.

To ensure that an actor 104 is at the proper movie set 300, actors 104 may be required to wear an electronic identification tag that identifies the actor's 104 whereabouts in the vicinity of the movie set 300. The electronic identification tag communicates wirelessly with the computer system 200. If the movie set location includes multiple movie sets, use of the electronic identification tag alerts the computer system 200 if an actor 104 is at the wrong movie set 300. Accordingly, the computer system 200 associates each electronic identification tag with a particular actor 104 and movie set 300.

Actors 104 may wear a heart rate monitor that communicates wirelessly with the computer system 200. Communication of the heart rate of the actors 104 to the virtual director module 220 during a scene allows the virtual director module 220 to make changes to the scene if one or more of the actors 104 show signs of a sudden increase in heart rate, which could indicate health problems or potentially premature conclusion of the scene. Dynamically changing the activity in the scene based on heart rate monitoring allows the virtual director module 220 to create a smooth transition into another part of the screenplay, and it helps prevent the video from depicting awkward pauses or sudden performance issues by an actor 104.

Various modifications of the embodiments described here can be made without departing from the spirit and scope of the invention as described above and as defined in the appended claims.

That which is claimed is:

1. A movie production system comprising:
   a computer system having machine readable memory and at least one processor executing a plurality of program modules, the computer system including:
   actor defined scene input data stored on the memory;
   a predefined set of scenes stored on the memory, wherein each predefined set of scenes corresponds to a particular storyline;
   the program modules including:
      a screenplay module that automatically generates a screenplay by selecting the particular storyline and corresponding predefined set of scenes including a sequence of scenes based on the actor defined scene input data;
      a virtual director module in operable communication with movie-making equipment at a movie set where the movie is filmed and that provides computer generated visual and/or audible cues to the actor while acting the screenplay indicating a change of scenes in the sequence of scenes; and
      a movie compiler module that receives video and audio data from the movie-making equipment and compiles the movie.

2. The movie production system of claim 1, wherein the movie making equipment includes at least one camera and at least one microphone.

3. The movie production system of claim 1, wherein the virtual director module provides audible cues to the actor via an earpiece worn thereby.

4. The movie production system of claim 1, wherein the virtual director module provides visual cues to the actor via one or more lighted displays located on the set.

5. The movie production system of claim 1, wherein the actor defined scene input data is input at a page executed by the computer system that displays data fields that the screenplay module uses to generate the screenplay.

6. A movie production system comprising:
   a computer system having machine readable memory and at least one processor that executes a plurality of successive program modules only in response to an actor's direct instruction thereto;
   the computer system including actor defined scene input data stored on the memory;
   a predefined set of scenes stored on the memory, wherein each predefined set of scenes corresponds to a particular storyline;
   the program modules including:
      a screenplay module that automatically generates a screenplay by selecting the particular storyline and corresponding predefined set of scenes including a sequence of scenes based on the actor defined scene input data;
      a virtual director module in operable communication with movie-making equipment at a movie set where the movie is filmed and that provides computer generated visual and/or audible cues to the actor while acting the screenplay indicating a change of scenes in the sequence of scenes; and
      a movie compiler that receives video and audio data from the movie-making equipment and compiles the movie.

7. The movie production system of claim 6, wherein the movie making equipment includes at least one camera and at least one microphone.

8. The movie production system of claim 6, wherein the virtual director module provides audible cues to the actor via an earpiece worn thereby.

9. The movie production system of claim 6, wherein the virtual director module provides visual cues to the actor via one or more lighted displays located on the set.

10. The movie production system of claim 6, wherein the actor defined scene input data is input at an interface executed by the computer system that displays a list of predetermined queries that the screenplay module uses to generate the screenplay.

11. A movie production method comprising:
   executing a plurality of program modules on a computer system having machine readable memory and at least one processor;
   generating a screenplay with a screenplay module, the screenplay including at least one sequence of scenes automatically selected from a predefined set of scenes corresponding to a particular storyline based on actor defined scene input data stored on the memory;
   recording the plurality of scenes at a movie set location automatically using a virtual director module in operable communication with movie-making equipment at the movie set, the virtual director module automatically providing visual and/or audible cues to actors in order for the actors to act out the at least one sequence of scenes from the storyline; and
   receiving video and audio data from the movie-making equipment by a movie compiler module that compiles the video and audio data to make the movie.

12. The method of claim 11, wherein the screenplay module, virtual director module, and movie compiler module are executed only in response to the actor's direct instruction.

13. The method of claim 11, wherein a non-actor does not interact with the virtual director module during operation.

14. The method of claim 11, wherein the virtual director module provides audible cues to the actor via an earpiece worn thereby.

15. The method of claim 11, wherein the virtual director module provides visual cues to the actor via one or more lighted displays located on the set.

* * * * *